(12) United States Patent
Okuma et al.

(10) Patent No.: US 6,784,661 B2
(45) Date of Patent: Aug. 31, 2004

(54) ROTATION DETECTING APPARATUS

(75) Inventors: Sakae Okuma, Tokyo (JP); Shinya Inabe, Tokyo (JP); Tetsuya Inotsuka, Tokyo (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 10/445,261

(22) Filed: May 27, 2003

(65) Prior Publication Data

US 2003/0222644 A1 Dec. 4, 2003

(51) Int. Cl.[7] ................................ G01B 7/30
(52) U.S. Cl. ................ 324/207.25; 324/207.2
(58) Field of Search ................ 324/207.25, 207.2, 324/207.16, 162, 173, 174; 73/862.331, 490

(56) References Cited

U.S. PATENT DOCUMENTS

| | | | |
|---|---|---|---|
| 5,055,781 A | * 10/1991 | Sakakibara et al. | .... 324/207.21 |
| 5,742,160 A | * 4/1998 | Bergstedt et al. | ...... 324/207.25 |
| 6,646,432 B1 | * 11/2003 | Malinowski | ................ 324/171 |

FOREIGN PATENT DOCUMENTS

| | | | |
|---|---|---|---|
| DE | 199 29 200 A1 | 12/2000 | |
| DE | 19929200 | * 12/2000 | |
| JP | 2000-283704 | 10/2000 | |

OTHER PUBLICATIONS

EPO Search Report dated Sep. 8, 2003.*

* cited by examiner

*Primary Examiner*—N. Le
*Assistant Examiner*—Subhash Zaveri
(74) *Attorney, Agent, or Firm*—Rader, Fishman & Grauer PLLC

(57) ABSTRACT

A rotation detecting apparatus including a drive gear rotatably supported by a case having a cover and capable of rotating cooperatively with an object to be detected, driven gears and brought in mesh with the drive gear and capable of rotating cooperatively therewith, magnets and provided at rotational center portions of the driven gears and having plane portions formed with N poles and S poles, a circuit board arranged at the case and capable of connecting to outside, magnetic reluctance elements attached to the circuit board and being opposed to the plane portions of the magnets and an electronic circuit part for converting an output signal of the magnetic reluctance element into a rotational angle signal, wherein the driven gears and are interposed by the case and the cover and a constant distance is maintained between the plane portion and the magnetic reluctance element.

2 Claims, 9 Drawing Sheets

(a)

(b)

ROTATION DETECTING APPARATUS

BACKGROUND OF THE INVENTION

1. Field of the Invention

The present invention relates to a rotation detecting apparatus provided for detecting a rotational angle of a steering wheel of an automobile or the like.

2. Description of Related Art

There is a conventional rotation detecting apparatus described in, for example, JP-A-2000-283704 as shown by FIG. 17. FIG. 17 shows a rotation detecting apparatus integrated to a rotational connector apparatus 101 for electrically connecting a vehicle body side thereof and a steering wheel side thereof. That is, a rotation detecting apparatus 107 is provided between a lower housing member 103 and a lower cover member 105 of the rotational connector apparatus 101. The rotation detecting apparatus 107 is generally constituted by a drive gear 109, a driven gear 111, and a circuit board 113.

The drive gear 109 is constructed by a constitution of being cooperatively rotated in accordance with rotation of the steering wheel. The driven gear 111 is brought in mesh with the drive gear 109. The driven gear 111 is provided with a magnet 115 at a rotational center portion thereof. The magnet 115 includes a plane portion 117. The plane portion 117 is contiguously formed with an N pole and an S pole with a rotational center of the driven gear 111 as a boundary. The driven gear 111 is constructed by a constitution in which one face side thereof is rotatably supported by the cover member 105 and other face side thereof is brought into sliding contact with the circuit board 113. The circuit board 113 is provided with a magnetic reluctance element 119 opposed to the plane portion 117 of the magnet 115.

Further, when the drive gear 109 is rotated in accordance with steering of the steering wheel, the driven gear 111 is rotated cooperatively therewith. When the magnet 115 is rotated by rotating the driven gear 111, a magnetic field of the magnetic reluctance element 119 opposed to the plane portion 117 formed with the N pole and the S pole is changed and a reluctance value of the magnetic reluctance element 119 is changed in accordance with the change. An angle signal can be outputted to an external system by converting the change into the angle signal by an electronic circuit portion.

Therefore, a steering angle of the steering wheel or the like can accurately be detected without restricting an angle detecting range.

However, according to the above-described structure, one side face of the driven gear 111 is directly brought into sliding contact with the circuit board 113 and therefore, when the driven gear 111 is rotated, vibration or the like is brought about at the circuit board 113. Therefore, there is a concern of effecting adverse influence by the vibration on a soldered portion of a circuit element mounted to the circuit board 113 or the magnetic reluctance element 119 per se and there is a concern of deteriorating durability and detection accuracy of the apparatus.

SUMMARY OF THE INVENTION

It is an object of the invention to provide a rotation detecting apparatus capable of promoting durability and promoting detection accuracy of the apparatus by restraining vibration or the like from being brought about on a side of a circuit board when a driven gear is rotated.

A first aspect of the invention is characterized in that in a rotation detecting apparatus comprising a drive gear supported rotatably by a case having a cover and capable of rotating cooperatively with an object to be detected, a driven gear brought in mesh with the drive gear and capable of rotating cooperatively therewith, a magnet provided at a rotational center portion of the driven gear and having an end face portion contiguously formed with an N pole and an S pole, a circuit board arranged at the case, and a magnetic reluctance element attached to the circuit board and being opposed to the end face portion of the magnet and an electronic circuit part for converting an output signal of the magnetic reluctance element into a rotational angle signal, wherein the driven gear is rotatably interposed by the case and the cover and a constant distance is maintained between the end face portion and the magnetic reluctance element.

A second aspect of the invention is a method of fabricating the driven gear for the rotation detecting apparatus according to the first aspect of the invention and is characterized in that the case, the cover, the drive gear and the driven gear are formed by materials having substantially the same linear expansion coefficient.

According to first aspect of the invention, when the drive gear rotatably supported by the case having the cover is rotated cooperatively with the object to be detected, the driven gear brought in mesh with the drive gear can be rotated cooperatively therewith. The driven gear is provided with the magnet having the end face portion contiguously formed with the N pole and the S pole at the rotational center portion and the magnet can be rotated along with the driven gear. The case is arranged with the circuit board, the circuit board is provided with the magnetic reluctance element opposed to the end face portion of the magnet, a magnetic field of the magnetic reluctance element is changed by rotating the magnet, the reluctance value of the magnetic reluctance element is changed in accordance with the change and a signal can be outputted. The output signal of the magnetic reluctance element is converted into the rotational angle signal by the electronic circuit part provided to the circuit board and can be outputted to an external system as an angle signal.

Further, the driven gear is rotatably interposed by the case and the cover, the constant distance is maintained between the end face portion of the magnet and the magnetic reluctance element and therefore, when the driven gear is rotated, the driven gear is rotatably supported by the case and the cover and vibration or the like can be restrained from being brought about at the circuit board. Therefore, adverse influence by vibration can be restrained from effecting on a soldered portion of a circuit element and the magnetic reluctance element mounted to the circuit board, durability of the apparatus is promoted, and rotation can be detected accurately.

According to the second aspect of the invention, in addition to an effect of the first aspect of the invention, since the case, the cover, the drive gear and the driven gear are formed by materials having substantially the same linear expansion coefficient, even when temperature is changed to high temperature or low temperature, an influence is restrained from effecting on a relative relationship among the case, the cover, the drive gear and the driven gear and the detection accuracy equivalent to that at normal temperature can be ensured.

DESCRIPTION OF PREFERRED EMBODIMENTS (First Embodiment)

Figure 1:
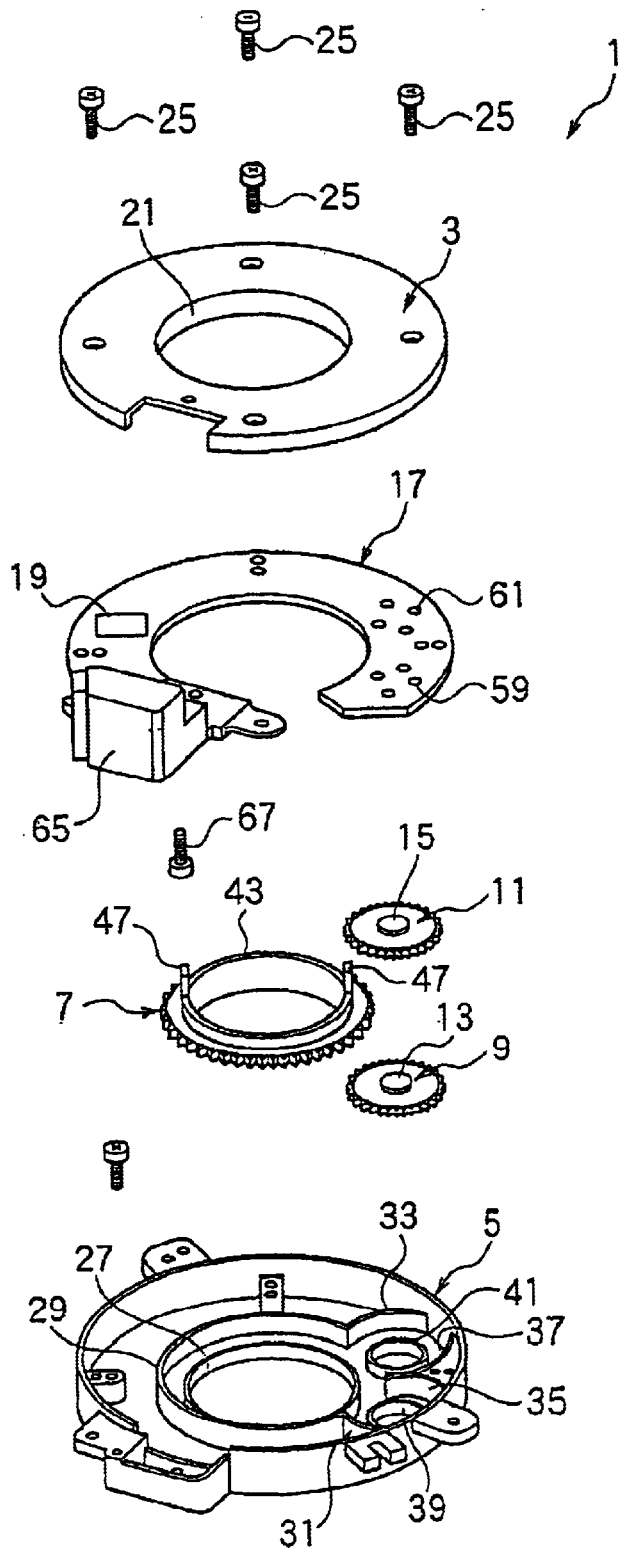
FIG. 1 is a disassembled perspective view of a rotation detecting apparatus according to a first embodiment of the invention.
Figure 2:
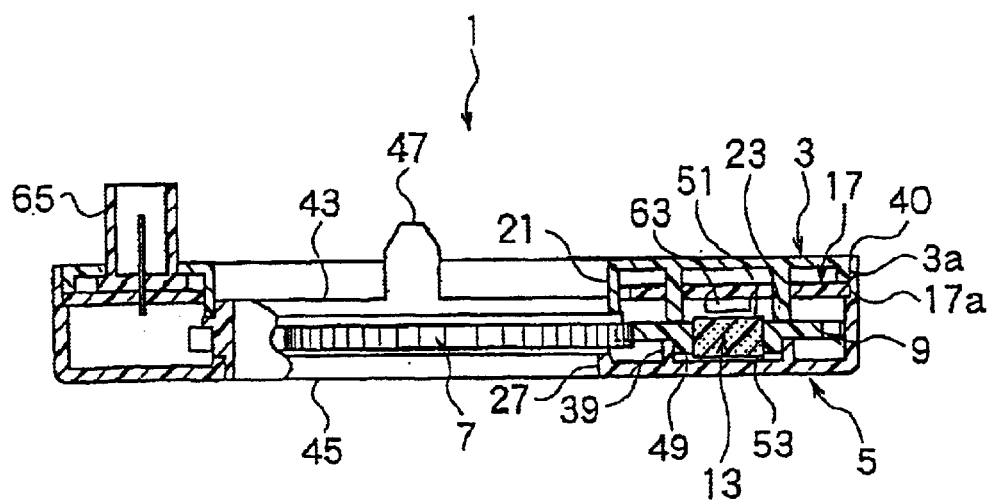
FIG. 2 is a sectional view of the rotation detecting apparatus according to the first embodiment.

FIG. 1 is a disassembled perspective view of a rotation detecting apparatus according to a first embodiment of the invention and FIG. 2 shows a sectional view of the rotation detecting apparatus. As shown by FIG. 1 and FIG. 2, according to a rotation detecting apparatus 1, a drive gear 7 is rotatably supported by a case 5 having a cover 3. A pair of driven gears 9 and 11 are rotatably supported between the cover 3 and the case 5. The respective driven gears 9 and 11 are brought in mesh with the drive gear 7. Magnets 13 and 15 are provided at rotational center portions of the driven gears 9 and 11.

The cover 3, the case 5, the drive gear 7, and the driven gears 9 and 11 are formed by resin materials having substantially the same linear expansion coefficient.

A number of teeth m of the drive gear 7 and a number of teeth n of the driven gear 9 or 11 are set to dividable values such that a value of n/m becomes a finite terminating decimal. Therefore, an error by rounding a numerical value is not brought about, operation at an electronic circuit part 19 can be simplified and accuracy thereof can be promoted.

The case 5 is arranged with a circuit board 17 connectable to outside. The circuit board 17 is attached with a magnetic reluctance element 63 and the electronic circuit part 19 for converting an output signal of the magnetic reluctance element 63 into a rotational angle signal.

Figure 3:
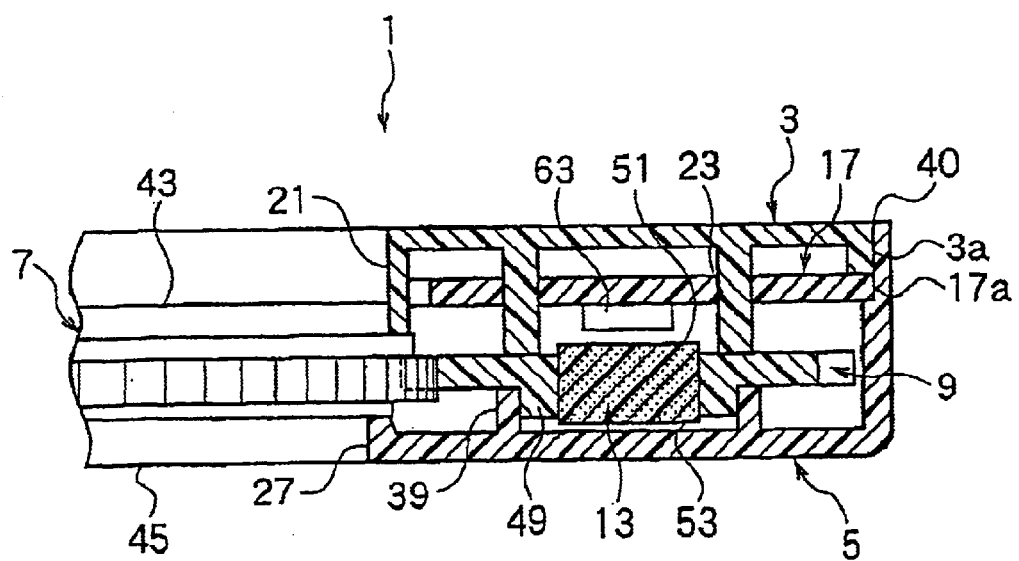
FIG. 3 is a sectional view enlarging an essential portion according to the first embodiment.
Figure 4:
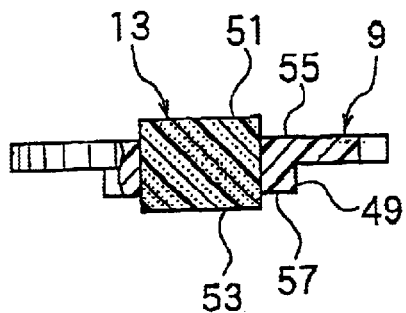
FIG. 4 is a front view constituting a section by a portion of a driven gear according to the first embodiment.
Figure 5:
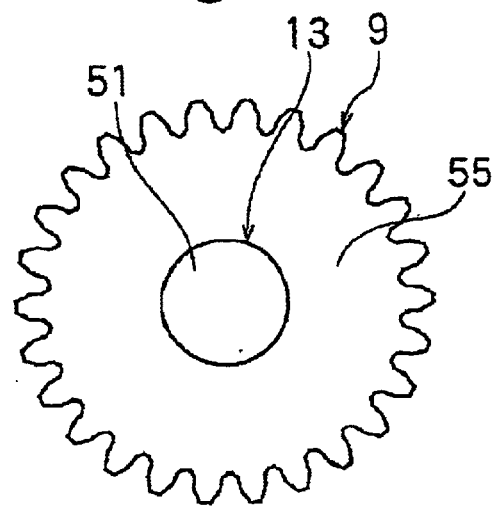
FIG. 5 is a plane view of the driven gear according to the first embodiment.
Figure 6:
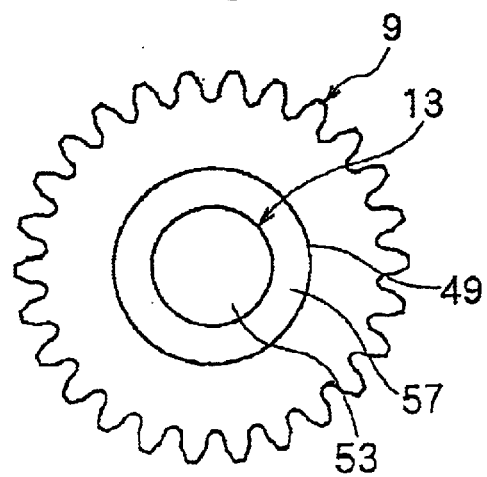
FIG. 6 is a bottom view of the driven gear according to the first embodiment.

A further explanation will be given here of details of respective portions also in reference to FIG. 3 through FIG. 6. FIG. 3 is a sectional view enlarging an essential portion of the rotation detecting apparatus 1, FIG. 4 is a front view constituting a section by a portion of the driven gear, FIG. 5 is a plane view of the driven gear, and FIG. 6 is a bottom view of the driven gear.

First, as shown by FIG. 1, FIG. 2 and FIG. 3, the cover 3 is provided with a support hole 21 for rotatably supporting to fit a side of the drive gear 7 at a central portion thereof. The cover 3 is provided with projected portions 23 respectively in correspondence with the respective driven gears 9 and 11. For example, four pieces of the projected portions 23 are provided for each of the respective driven gear 9 and 11 and uniformly arranged in peripheral directions centering on rotational centers of the respective driven gears 9 and 11. The cover 3 is fixedly fastened to the case 5 along with the circuit board 17 by, for example, four pieces of tapping screws 25.

The case 5 is provided with a support hole 27 for rotatably supporting the drive gear 7. At a surrounding of the support hole 27, there is provided a peripheral wall portion 29 for surrounding an outer periphery of the drive gear 7 with a clearance therebetween. The peripheral wall portion 29 is continuous with wall portions 31 and 33 extended to sides of the driven gears 9 and 11. Wall portions 35 and 37 are provided at a middle portion at which the wall portions 31 and 33 are opposed to each other. There is constructed a constitution in which the outer periphery of the driven gear 9 is surrounded by the wall portions 31 and 35 and the outer periphery of the driven gear 11 is surrounded by the wall portions 33 and 37 with clearances therebetween. Driven gear supporting portions 39 and 41 are projected in a cylindrical shape at a central portion between the wall portions 31 and 35 and a central portion between the wall portions 33 and 37. The case 5 is provided with a fitting recess portion 40 at an inner peripheral face thereof on a side of the cover 3.

The drive gear 7 is projected with fitting boss portions 43 and 45 at two side faces thereof. The fitting boss portion 43 on one side is projected with a pair of engaging claws 47. The engaging claw 47 is constructed by a constitution of engaging with a side of the steering wheel which is an object to be detected and rotating the drive gear 7 cooperatively with rotation on the side of the steering wheel.

The driven gears 9 and 11 will be explained also in reference to FIG. 4 through FIG. 6. The explanation will be given of the driven gear 9 since the driven gears 9 and 11 are constituted by the same structure. The driven gear 9 includes a fitting boss portion 49. The magnet 13 is concentrically provided at the rotational center portion of the driven gear 9. The magnet 13 is formed in a cylindrical shape and is subjected to insert molding with the driven gear 9.

The magnet 13 includes plane portions 51 and 53 as end face portions thereof. The plane portions 51 and 53 are formed to project from faces 55 and 57 of the driven gear 13. However, the plane portions 51 and 53 can also be formed to be flush with the faces 55 and 57.

The plane portion 51 is formed with an N pole and an S pole contiguously with the rotational center as a boundary. The plane portion 51 is magnetized with N-S with the rotational center of the driven gear 7 as a reference after subjecting a magnetic body before being magnetized in a cylindrical shape formed by the injection molding to insert molding with the driven gear 7.

The circuit board 17 is provided with pluralities of through holes 59 and 61 at positions respectively in correspondence with the driven gear supporting portions 39 and 41. The through holes 59 and 61 are for loosely fitting the respective projected portions 23 of the cover 3. The circuit board 17 is respectively provided with the magnetic reluctance elements 63 opposed to the plane portions 51 of the magnets 13 and 15 above the driven gear supporting portions 39 and 41. The circuit board 17 is provided with a connector 65. The connector 65 is made connectable to outside and is fixed to the circuit board 17 by, for example, a tapping screw 67. However, the connector 65 can also be connected to the side of the case 5 by a tapping screw.

The electronic circuit part 19, the magnetic reluctance element 63 and the connector 65 constitute a circuit above the circuit board 17.

Further, the fitting boss portion 45 of the drive gear 7 is fittedly supported by the drive gear supporting hole 27 of the case 5. The driven gears 9 and 11 are respectively supported by the driven gear supporting portions 39 and 41. The support is carried out by fitting the fitting boss portions 49 of the driven gears 9 and 11 to the driven gear supporting portions 39 and 41.

The circuit board 17 is fitted to the case 5 and an outer peripheral portion 17a thereof is fittedly supported by the fitting recess portion 41 of the case 5. The cover 3 is fitted to the case 5 and an outer peripheral portion 3a of the cover 3 is fittedly supported by the fitting recess portion 40 of the cover 3. The respective projected portions 23 of the cover 3 respectively penetrate the through holes 59 and 61 and front ends thereof are respectively opposed to the driven gears 9 and 11.

The case 5 and the cover 3 are fixedly fastened by the tapping screws 25. Thereby, there is constructed a constitution in which the driven gears 9 and 11 are rotatably interposed by the driven gear supporting portions 39 and 41 and the projected portions 23 and the driven gears 9 and 11 are rotatably interposed by the case 5 and the cover 3. That is, the driven gears 9 and 11 are rotatable around rotational centers thereof in the interposed state.

In a state in which the driven gears 9 and 11 are supported as described above, a constant distance is maintained between the plane portions 51 of the magnets 13 and 15 and the magnetic reluctance elements 63 with the case 5 as a reference.

Figure 7:
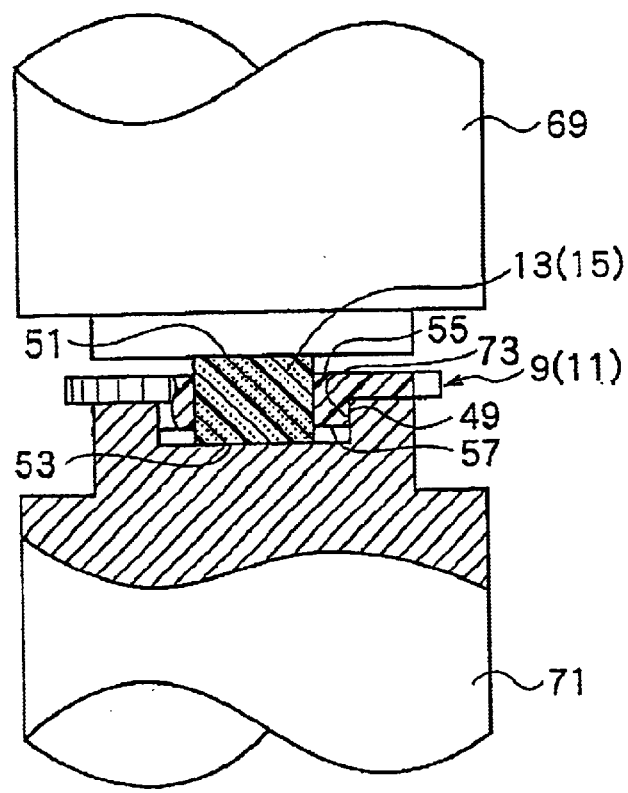
FIG. 7A is an explanatory view showing a magnetizing step and FIG. 7B is a perspective view of a magnet after having been magnetized according to the first embodiment.
Figure 7:
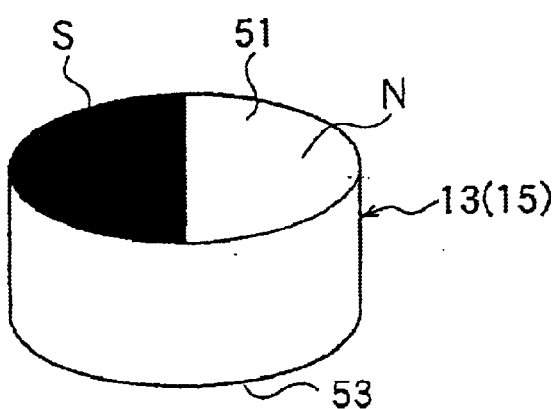

FIG. 7A shows a step of magnetizing the magnet 13 of the driven gear 9 by a magnetizing apparatus and FIG. 7B shows the magnet 13 after having been magnetized. Further, the magnetizing step is similar to that of the magnet 15 of the driven gear 11, the magnet 13 of the driven gear 9 will mainly be explained and correspondence of the magnet 15 of the driven gear 11 will be shown by attaching a bracket.

The magnetizing apparatus of FIG. 7A is provided with a magnetic pole 69 for magnetizing and a jig 71. The jig 71 is formed with a recess portion 73.

In fabricating the driven gear 9 having the magnet 13, a magnetic body in a cylindrical face before being magnetized constituting a base member of the magnet 13 (magnet 13 before being magnetized) is formed by injection molding of plastic base. Injection molding of the plastic base signifies that a resin of nylon, PPS or the like is mixed with a magnetic powder and the magnetic body before being magnetized is formed in a cylindrical shape by injection molding. A blend ratio of the resin and the magnetic powder can variously be selected. As the magnetic powder, for example, a neodymium alloy, a samarium-cobalt alloy or the like is used.

The magnetic body in the cylindrical shape is provided at a rotational center portion of the driven gear 9 by subjecting the resin to insert molding.

Thereafter, the plane portion 51 of the magnetic body is magnetized between the magnetic hole 69 and the jig 71 of FIG. 7A. In this case, the fitting boss portion 49 of the driven gear 9 is fittedly supported by the recess portion 73 of the jig 71. By the support, centers of the magnetic pole 69 and the jig 71 and a rotational center of the driven gear 9 are aligned. Under the state, N-S poles are magnetized at the plane portion 51 of the magnetic body with the rotational center of the driven gear 9 as a reference and the N pole and the S pole are accurately formed at the plane portion 51 of the magnet 13 with the rotational center as a boundary as shown by FIG. 7B.

In the magnetizing, since the plane portions 51 and 53 which are upper and lower faces of the magnetic body are projected from the faces 55 and 57 of the driven gear 9, the plane portions 51 and 53 can firmly be brought into close contact with faces of the magnetic pole 69 and the jig 71 and the magnetizing by the magnetic pole 69 can efficiently be carried out. Further, even when the plane portions 51 and 53 are flush with the faces 55 and 57 of the driven gear 9, a similar effect can be achieved.

In the above-described rotation detecting apparatus, the case 5 is attached to a base of a combination switch or the like, the engaging claw 47 is engaged with the side of the steering wheel and the drive gear 7 can be rotated cooperatively with the side of the steering wheel which is the object to be detected.

When the drive gear 7 is rotated in accordance with steering of the steering wheel, the driven gears 9 and 11 which are brought in mesh with the drive gear 7 are cooperatively rotated. By rotating the driven gears 9 and 11, the magnets 13 and 15 are rotated and the magnetic fields of the magnetic reluctance elements 63 opposed thereto are changed and the reluctance value of the magnetic reluctance element 63 is changed in accordance with the change.

The change of the reluctance value is converted into an angle signal by the electronic circuit part 19 and outputted as the angle signal to an external system via the connector 65. Therefore, a rotational angle of the object to be detected of the steering wheel or the like can accurately be detected.

According to the embodiment, particularly, the driven gears 9 and 11 are rotatably interposed by the driven gear supporting portions 39 and 41 of the case 5 and the projected portions 23 of the cover 3, a constant distance is maintained between the plane portion 51 of each of the magnets 13 and 15 and the magnetic reluctance element 63 of the circuit board 17, the circuit board 17 and the driven gears 9 and 11 are not brought in direct contact with each other and therefore, vibration or the like at the circuit board 17 in accordance with rotation of the driven gears 9 and 11 is restrained from being brought about. The effect is further promoted when the respective projected portions 23 are brought into a loosely fitted state with the through holes 59 and 61 of the circuit board 17.

Therefore, adverse influence by vibration is restrained from being effected on the magnetic reluctance element 63 and the rotational angle can accurately be detected. Further, also adverse influence on a soldered portion of a circuit element mounted to the circuit board 17 is restrained and durability can significantly be promoted.

According to the embodiment, the drive gear 7 is provided with two pieces of the driven gears 9 and 11 having the same teeth number and two of the magnetic reluctance elements 63 in correspondence therewith and therefore, when a difference between respective detection angles is equal to or larger than a prescribed amount by detection by the respective magnets 13 and 15 of the respective driven gears 9 and 11 and the respective magnetic reluctance elements 63, the apparatus can be determined to be failed and a failure signal can be outputted.

The cover 3, the case 5, the drive gear 7 and the driven gears 9 and 11 are formed by resin materials having substantially the same linear expansion coefficient and therefore, even when temperature is changed as in high temperature or low temperature, influence is restrained from effecting on a relative relationship among the case 5, the cover 3, the drive gear 7 and the driven gears 9 and 11 and detection accuracy equivalent to that in normal temperature can be ensured.

(Second Embodiment)

Figure 8:
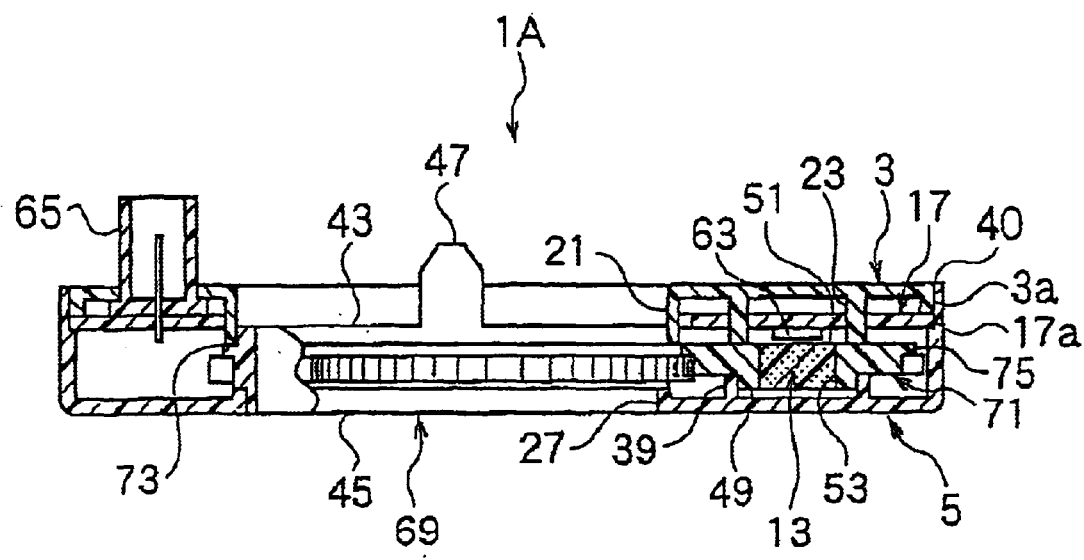
FIG. 8 is a sectional view of a rotation detecting apparatus according to a second embodiment of the invention.
Figure 9:
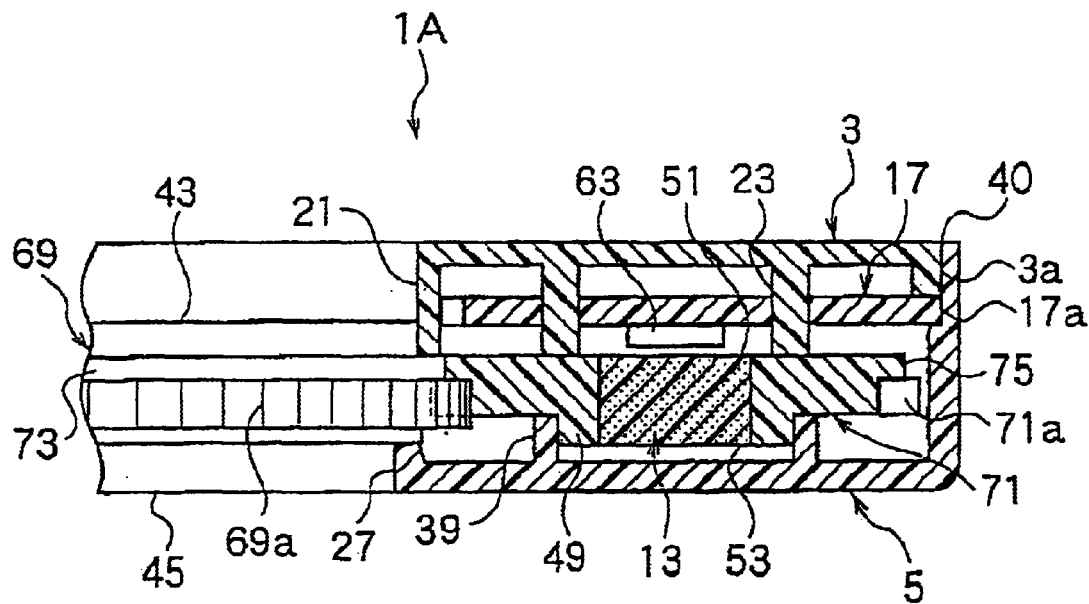
FIG. 9 is a sectional view enlarging an essential portion according to the second embodiment.
Figure 10:
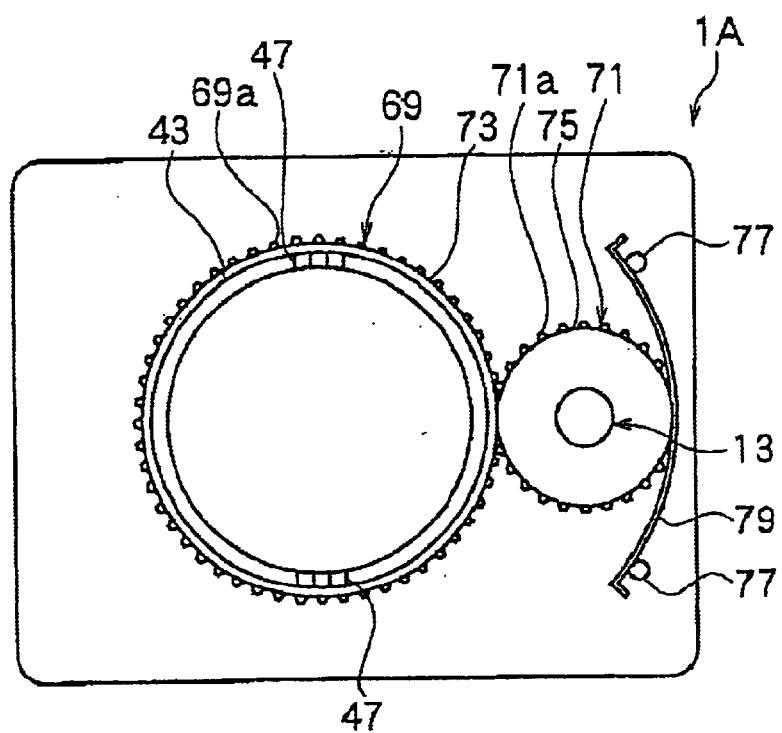
FIG. 10 is a perspective plane view viewed from a side of a cover according to the second embodiment.
Figure 11:
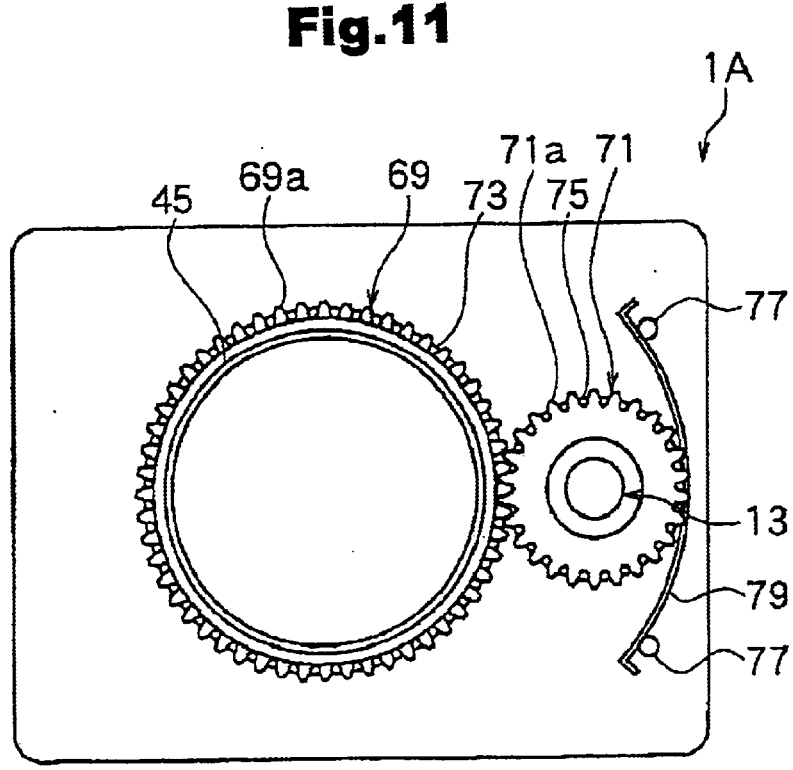
FIG. 11 is a perspective bottom view viewed from a side opposed to the cover according to the second embodiment.
Figure 12:
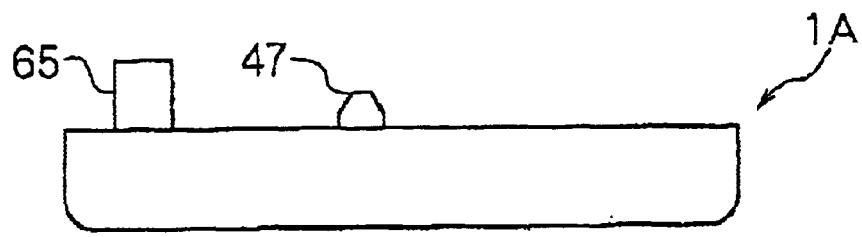
FIG. 12 is a side view of the rotation detecting apparatus according to the second embodiment.
Figure 13:
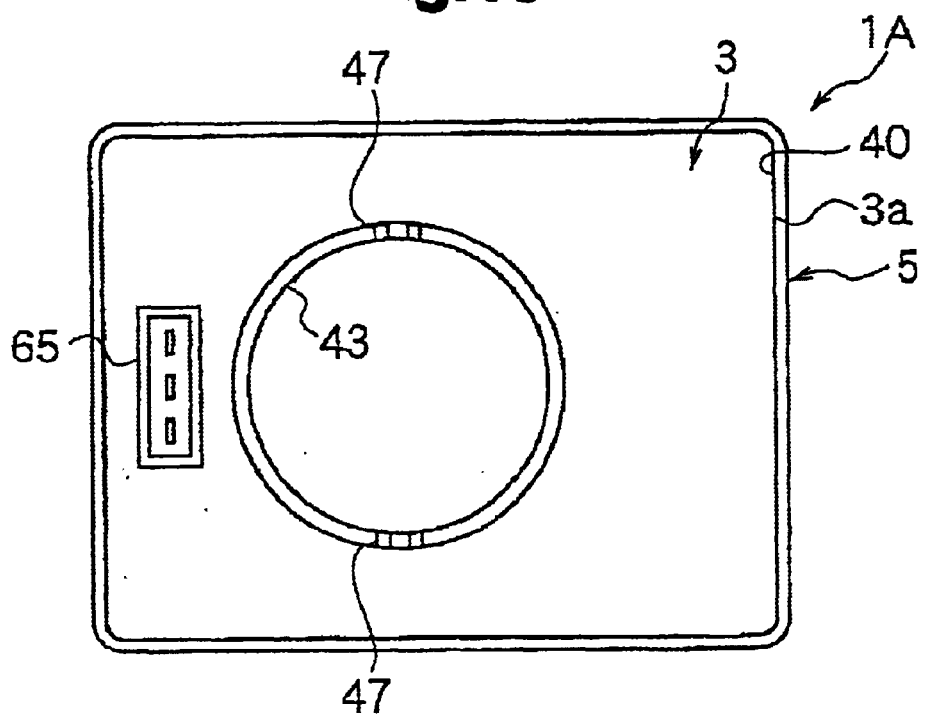
FIG. 13 is a plane view of the rotation detecting apparatus according to the second embodiment.
Figure 14:
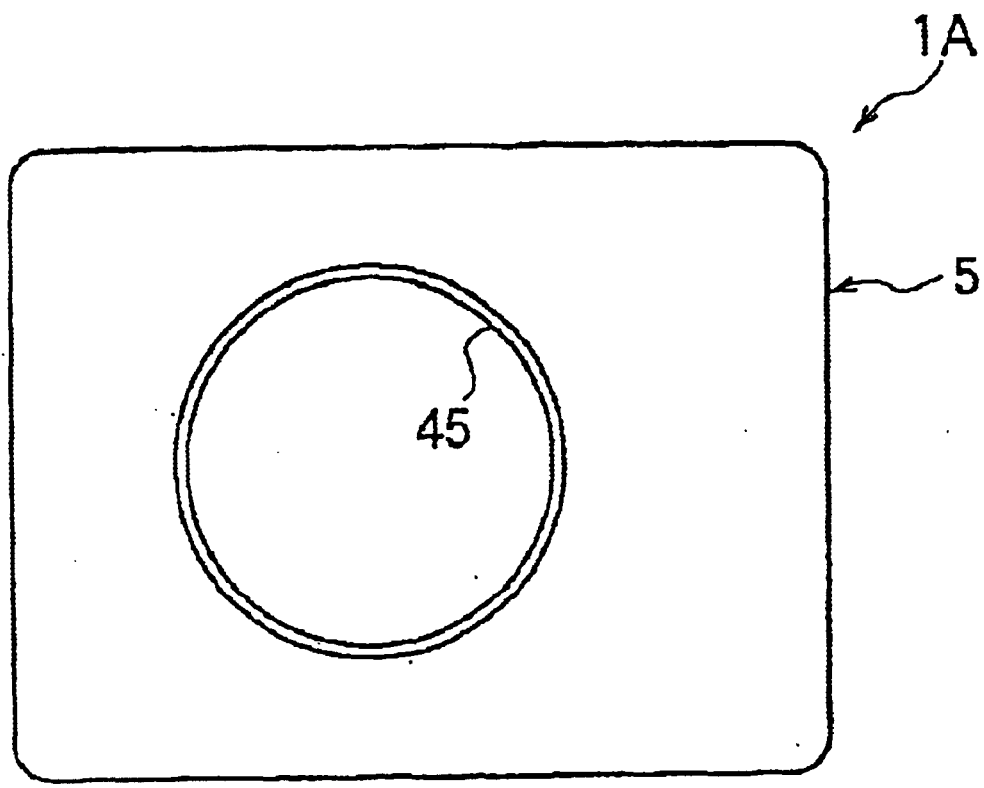
FIG. 14 is a bottom view of the rotation detecting apparatus according to the second embodiment.

FIG. 8 through FIG. 14 shows a second embodiment of the invention. FIG. 8 is a sectional view of a rotation detecting apparatus according to the second embodiment, FIG. 9 is a sectional view enlarging an essential portion thereof, FIG. 10 is a perspective plane view viewed from a side of the cover, FIG. 11 is a perspective bottom view viewed from a side opposed to the cover, FIG. 12 is a side view, FIG. 13 is a plane view and FIG. 14 is a bottom view. Further, also the embodiment is basically similar to the first embodiment and an explanation will be given thereof by attaching the same notations to corresponding constituent portions.

According to a rotation detecting apparatus 1A of the embodiment, as shown by FIG. 8 through FIG. 14, the drive gear and the driven gear are respectively provided with ring portions 73 and 75. According to the ring portions 73 and 75, outer diameters thereof are formed by diameters in correspondence with respective pitch circles of a drive gear 69 and a driven gear 71.

According to the embodiment, the drive gear 69 and the driven gear 71 as well as the respective ring portions 73 and 75 are formed by elastic bodies, for example, elastomer. However, it is also possible to form only either one of the drive gear 69 and the driven gear 71 by an elastic body of elastomer or the like and constitute only one of the ring portions 73 and 75 by an elastic body.

As shown by FIG. 10 and FIG. 11, the case 5 is provided with engaging pins 77 at both sides of the driven gear 71. Respective end portions of a leaf spring 79 are engaged with and supported by the respective engaging pins 77. The leaf spring 79 is brought into elastic contact with the ring portion 75 of the driven gear 71.

Therefore, the driven gear 71 is brought into a state of being urged to a side of the drive gear 73. Thereby, the ring portion 73 of the drive gear 69 and the ring portion 75 of the driven gear 71 are brought into elastic contact with each other by a press force to generate pertinent friction force.

However, it is also possible to arrange the ring portions 73 and 75 to be brought into elastic contact with each other by the press force to generate the pertinent friction force by omitting the leaf spring 79. That is, when rotating shafts of the drive gear 69 and the driven gear 71 are rotatably supported by the case 5 at fixed positions to thereby bring the ring portions 73 and 75 into elastic contact with each other, the leaf spring 79 can be omitted.

When the drive gear 69 is rotated, the driven gear 71 in mesh therewith is driven by light load of substantially sliding resistance against the case 5 and the cover 3 and mesh resistance between the drive gear 69 and the driven gear 71.

Further, when the drive gear 69 is rotated cooperatively with, for example, a steering wheel which is an object to be detected, the driven gear 71 is rotated by friction force between the ring portion 73 of the drive gear 69 and the ring portion 75 of the driven gear 71. At this occasion, the press force of the leaf spring 79 generates pertinent friction force between the ring portions 73 and 75.

Therefore, even when there is a backlash between a teeth portion 69a of the drive gear 69 and a teeth portion 71a of the driven gear 71, the ring portions 73 and 75 are brought into contact with each other to rotate on the pitch circles and therefore, the rotational angle can further accurately be detected basically under a state in which the backlash is not present.

Even when slippage is generated between the ring portions 73 and 75 by accidentally enlarging the load of the driven gear 71, a shift equal to or larger than the backlash is not brought about by bringing the teeth portions 69a and 71a in mesh with each other. Therefore, it is at least possible to bring about a state in which the detection accuracy is not equal to or smaller than the detection accuracy of the first embodiment.

Further, at least either one of the ring portions 73 and 75 can be formed separately from the drive gear 69 or the driven gear 71.

Figure 15:
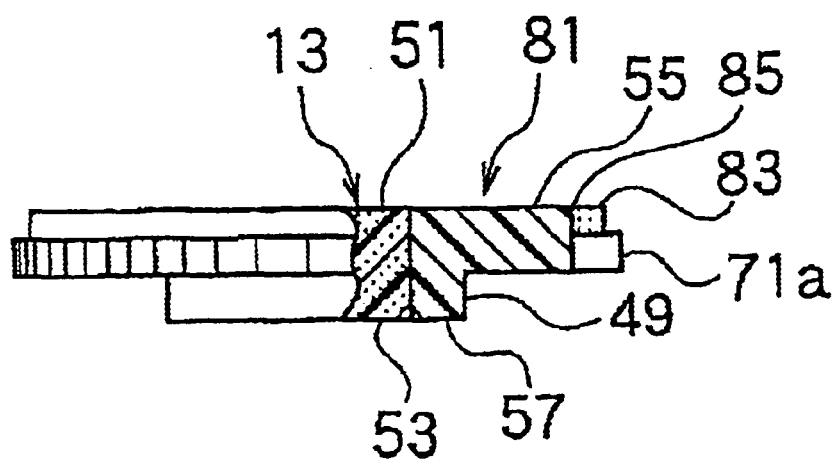
FIG. 15 shows an embodiment according to a modified example of a driven gear of the second embodiment and is a front view constituting a section by a portion thereof.
Figure 16:
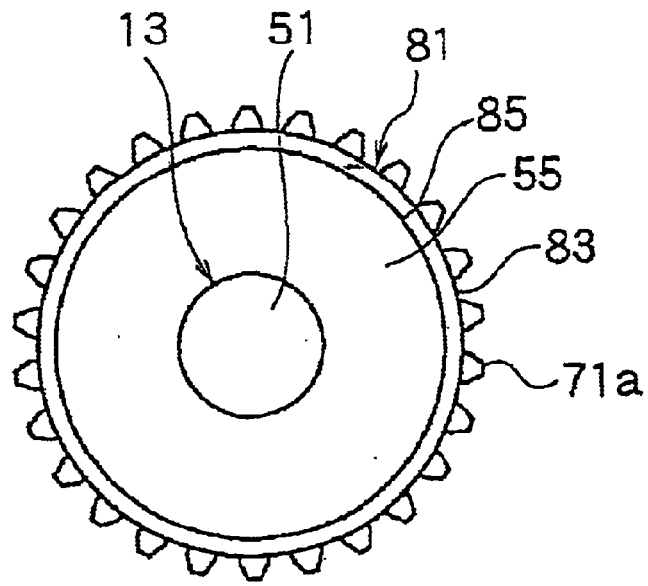
FIG. 16 relates to an embodiment according to the modified example of the driven gear of the second embodiment and is a plane view thereof.
Figure 17:
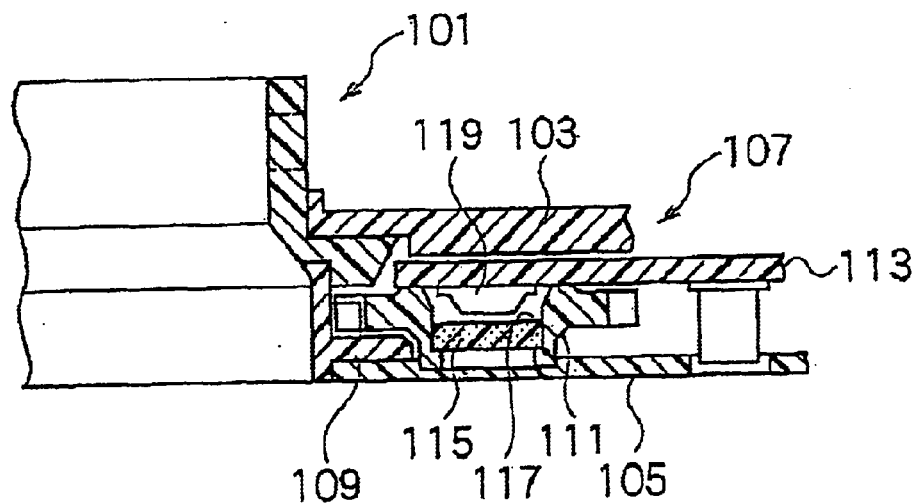
FIG. 17 is a sectional view of a rotation detecting apparatus according to a conventional example.

FIG. 15 and FIG. 16 show an embodiment of such a modified example, FIG. 15 is a front view constituting a section by a portion of a driven gear 81 and FIG. 16 is a plane view thereof. As shown by FIG. 15 and FIG. 16, a ring portion 83 is separately formed and attached fittedly to a boss portion 85 of the driven gear 81. The attachment can be fixed by press-fitting, adhesion or the like. The ring portion 83 is formed by, for example, an elastic body of elastomer or the like similar to the above-described.

Therefore, a function similar to that of the ring portion 75 can be achieved also by the ring portion 83.

Further, in the case of FIG. 15 and FIG. 16, when the ring portion 83 is worn, only the ring portion 83 can pertinently be interchanged and the maintenance cost can be reduced.

Further, although according to the embodiment, the rotational angle of the steering wheel as the object to be detected is detected, a constitution of detecting a rotational angle of other rotating body can also be constructed.

The project portion 23 may be able to interpose rotatably the driven gear 9, 11, 71 or 81 and further stable support can be carried out thereby by providing a length to some degree in the peripheral direction.

Although the magnetic body in the cylindrical shape before being magnetized for forming the magnet 13 or 15 is provided at the driven gear 9, 11, 71 or 81 by insert molding, there can also be constructed a constitution in which the magnetic body before being magnetized is fixed to the driven gear 9, 11, 71 or 81 by adherence or the like and the magnetic body is magnetized with the rotational center of the driven gear 9, 11, 71 or 81 as the reference thereafter.

It is also possible to fix the magnet 13 or 15 after having been magnetized to the driven gears 9, 11, 71, or 81 by insert molding or to fix the magnet 13 or 15 to the driven gear 9, 11, 71, or 81 separately molded by adhesion.

In either of the embodiment of constituting the magnet 13 or 15 by magnetizing the magnet after subjecting the driven gear 9, 11, 71, or 81 to insert molding with the magnetic body or the embodiment of attaching the magnet 13 or 15 after having been magnetized to the driven gear 9, 11, 71, or 81, it is also possible to construct a constitution in which the magnet 13 or 15 is provided to expose only at the face of the driven gear 13 or 15 on the side of the magnetic reluctance element 63 without forming the magnet 13 or 15 to penetrate the driven gear 9, 11, 71, or 81.

The magnet 13 or 15 is for generating a uniform magnetic field in a constant direction at the magnetic reluctance element 63 by rotation and is not limited to the cylindrical shape but may be formed in a rectangular parallelepiped or the like so far as the similar function is achieved.

Other than injection molding of plastic base, the magnet 13 or 15 which is sintered can also be subjected to insert molding or the like with the driven gear 9, 11, 71 or 81.

The case 5, the cover 3, the drive gear 7, 69 and the driven gear 9 can also be formed by resin materials having different linear expansion coefficients and can also be formed by a material other than the resin.

The teeth number m of the drive gear 7 and the teeth number n of the driven gear 9 or 11 can arbitrarily be selected other than the above-described.

What is claimed is:

1. A rotation detecting apparatus comprising:
   a drive gear supported rotatably by a case having a cover and capable of rotating cooperatively with an object to be detected;
   a driven gear brought in mesh with the drive gear and capable of rotating cooperatively therewith;
   a magnet provided at a rotational center portion of the driven gear and having an end face portion contiguously formed with an N pole and an S pole;
   a circuit board arranged at the case; and
   a magnetic reluctance element attached to the circuit board and being opposed to the end face portion of the magnet and an electronic circuit part for converting an output signal of the magnetic reluctance element into a rotational angle signal;
   wherein the driven gear is rotatably interposed by the case and the cover and a constant distance is maintained between the end face portion and the magnetic reluctance element.

2. The rotation detecting apparatus according to claim 1, wherein the case, the cover, the drive gear and the driven gear are formed by materials having substantially the same linear expansion coefficient.

* * * * *

UNITED STATES PATENT AND TRADEMARK OFFICE
CERTIFICATE OF CORRECTION

PATENT NO. : 6,784,661 B2
DATED : August 31, 2004
INVENTOR(S) : Sakae Okuma

It is certified that error appears in the above-identified patent and that said Letters Patent is hereby corrected as shown below:

Title page,
Insert Item:
-- [30]  Foreign Application Priority Data
  May 28, 2002  (JP)    P2002-153760 --

Signed and Sealed this

Ninth Day of November, 2004

JON W. DUDAS
*Director of the United States Patent and Trademark Office*